US008747098B1

(12) United States Patent
Johnson et al.

(10) Patent No.: US 8,747,098 B1
(45) Date of Patent: *Jun. 10, 2014

(54) THERMOPLASTIC PULTRUSION DIE SYSTEM AND METHOD

(71) Applicant: Ebert Composites Corporation, Chula Vista, CA (US)

(72) Inventors: David W. Johnson, San Diego, CA (US); Scott A. Garrett, San Diego, CA (US); Stephen G. Moyers, Jamul, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,087

(22) Filed: Oct. 9, 2013

Related U.S. Application Data

(63) Continuation-in-part of application No. 13/738,126, filed on Jan. 10, 2013, now Pat. No. 8,684,722, which is a continuation of application No. 13/407,629, filed on Feb. 28, 2012, now Pat. No. 8,353,694, which is a continuation of application No. 12/409,389, filed on Mar. 23, 2009, now Pat. No. 8,123,510.

(60) Provisional application No. 61/070,754, filed on Mar. 24, 2008, provisional application No. 61/714,954, filed on Oct. 17, 2012.

(51) Int. Cl.
*B29C 47/16* (2006.01)
*B29C 47/92* (2006.01)

(52) U.S. Cl.
CPC ..................... *B29C 47/92* (2013.01)
USPC ........... 425/466; 425/141; 425/145; 425/150; 425/465; 425/382.4; 156/245; 156/312; 156/433; 156/500

(58) Field of Classification Search
USPC .............. 425/381, 382.4, 461, 465, 466, 140, 425/141, 145, 150; 156/166, 180, 245, 312, 156/433, 441, 500
See application file for complete search history.

(56) References Cited

U.S. PATENT DOCUMENTS 569,335 A 10/1896 Hudson
3,252,181 A 5/1966 Hureau
(Continued)

FOREIGN PATENT DOCUMENTS

JP 09132207 A 5/1997
JP 10273107 A 10/1998
JP 2000062023 A 2/2000

OTHER PUBLICATIONS

Office Action dated Mar. 11, 2013 for related U.S. Appl. No. 13/738,126 in 9 pages.

*Primary Examiner* — Seyed Masoud Malekzadeh
(74) *Attorney, Agent, or Firm* — Stephen C. Beuerle; Procopio Cory Hargreaves & Savitch LLP

(57) ABSTRACT

A thermoplastic pultrusion die system for pultruding a thermoplastic composite includes a first pultrusion die member with a curved, concave top surface; a second pultrusion die member with a curved, convex bottom surface; a curved die cavity gap formed between the a curved, concave top surface of the first pultrusion die member and the curved, convex bottom surface of the second pultrusion die member; a die cavity gap adjustment mechanism that imparts movement to at least one of the first pultrusion die member and the second pultrusion die member to vary the die cavity gap from closed to a specified location to open at a specified location; a pultrusion gripper mechanism having one or more grippers in series, and a computer numerical control (CNC) computer system controlling the die cavity gap adjustment mechanism.

16 Claims, 13 Drawing Sheets

(56) References Cited

U.S. PATENT DOCUMENTS

| | | | | |
|---|---|---|---|---|
| 3,270,370 | A | 9/1966 | Mercer | |
| 3,698,988 | A | 10/1972 | Skobel | |
| 3,843,434 | A * | 10/1974 | Heiks et al. | 156/64 |
| 3,930,922 | A | 1/1976 | Donoghue et al. | |
| 4,088,721 | A | 5/1978 | Apicella, Jr. | |
| 4,142,010 | A | 2/1979 | Pipkin et al. | |
| 4,259,133 | A | 3/1981 | Yagi | |
| 4,283,168 | A | 8/1981 | Miller et al. | |
| 4,319,947 | A | 3/1982 | Tokuno | |
| 4,445,957 | A * | 5/1984 | Harvey | 156/180 |
| 4,470,790 | A | 9/1984 | Harada et al. | |
| 4,498,941 | A | 2/1985 | Goldsworthy | |
| 4,504,347 | A * | 3/1985 | Munk et al. | 156/245 |
| 4,519,962 | A | 5/1985 | Schlienkamp | |
| 4,522,678 | A | 6/1985 | Zieke | |
| 4,615,758 | A * | 10/1986 | Held | 156/359 |
| 4,773,841 | A * | 9/1988 | Kawatsuji | 425/141 |
| 4,971,537 | A | 11/1990 | Hoffman et al. | |
| 4,988,278 | A * | 1/1991 | Mills | 425/466 |
| 5,057,267 | A * | 10/1991 | Seizert et al. | 264/541 |
| 5,273,595 | A | 12/1993 | Tomic et al. | |
| 5,281,291 | A | 1/1994 | Yada et al. | |
| 5,411,692 | A | 5/1995 | DiPietro et al. | |
| 5,439,711 | A | 8/1995 | Vu et al. | |
| 5,507,994 | A * | 4/1996 | Cornils et al. | 264/252 |
| 5,536,343 | A | 7/1996 | Kuse | |
| 5,645,785 | A | 7/1997 | Cornils et al. | |
| 5,656,223 | A | 8/1997 | Yada et al. | |
| 5,935,698 | A | 8/1999 | Pannell | |
| 6,117,260 | A | 9/2000 | Rossi | |
| 6,264,746 | B1 | 7/2001 | Peng | |
| 6,296,733 | B1 * | 10/2001 | Hudkins et al. | 156/245 |
| 6,645,333 | B2 | 11/2003 | Johnson et al. | |
| 6,676,785 | B2 | 1/2004 | Johnson et al. | |
| 7,105,071 | B2 | 9/2006 | Johnson et al. | |
| 7,172,403 | B2 | 2/2007 | Burke | |
| 7,175,415 | B2 * | 2/2007 | Kossl | 425/466 |
| 7,387,147 | B2 | 6/2008 | Johnson et al. | |
| 7,497,679 | B2 | 3/2009 | Mamada | |
| 7,785,693 | B2 | 8/2010 | Johnson et al. | |
| 7,819,077 | B2 * | 10/2010 | Yapel | 118/100 |
| 7,846,528 | B2 | 12/2010 | Johnson et al. | |
| 2002/0014302 | A1 * | 2/2002 | Fanucci et al. | 156/179 |
| 2002/0144767 | A1 | 10/2002 | Johnson et al. | |
| 2002/0153084 | A1 * | 10/2002 | Johnson et al. | 156/148 |
| 2004/0003885 | A9 | 1/2004 | Johnson et al. | |
| 2004/0051986 | A1 | 3/2004 | Sahara et al. | |
| 2004/0137231 | A1 | 7/2004 | Johnson et al. | |
| 2005/0074593 | A1 | 4/2005 | Day et al. | |
| 2006/0191351 | A1 | 8/2006 | Meehan et al. | |
| 2008/0031996 | A1 * | 2/2008 | Mamada | 425/546 |
| 2010/0108246 | A1 | 5/2010 | Sanchez-Brunete Alvarez | |

\* cited by examiner

THERMOPLASTIC PULTRUSION DIE SYSTEM AND METHOD

CROSS REFERENCE TO RELATED APPLICATIONS

This application is a continuation-in-part application of U.S. nonprovisional patent application Ser. No. 13/738,126, which was filed on Jan. 10, 2013, which issued as U.S. Pat. No. 8,684,722 on Apr. 1, 2014 which is a continuation of U.S. patent application Ser. No. 13/407,629 filed Feb. 28, 2012, which issued as U.S. Pat. No. 8,353,694 on Jan. 15, 2013, which is a continuation of Ser. No. 12/409,389 filed Mar. 23, 2009, which issued as U.S. Pat. No. 8,123,510 on Feb. 28, 2012 and claims priority to U.S. provisional patent application 61/070,754 filed Mar. 24, 2008 under 35 U.S.C. 119. The present application also claims priority to U.S. Provisional Patent Application 61/714,954 filed Oct. 17, 2012 under 35 U.S.C. 119. The above applications are incorporated by reference herein.

FIELD OF THE INVENTION

The present invention relates to composite material pultrusion systems and methods.

BACKGROUND OF THE INVENTION

In the past, a lay-up of thermoplastic tapes have been pultruded. The tapes were a very coordinated and impregnated series of fiber (such as fiber glass, carbon, aramid, or the like) and fiber bundles that are processed in parallel and fully coated with thermoplastic resin. Example resins used include, but are not limited to, Polypropylene, Polyethylene, and Polyetheretherketone. Example manufacturers of these tapes include, but are not limited to, Polystrand, Inc. of Montrose, Colo., Applied Fiber Systems of Clearwater, Fla., and Suprem AG of Flurligen, Switzerland.

An example composite panel including thermoplastic tape successfully pultruded in the past was 12 inches wide, 0.303 inches thick, and contained 32 layers of Polystrand thermoplastic tape (60% fiber, 40% Polypropylene). In this panel, there were 21 layers of thermoplastic tape in the 0 degree direction, which is the direction of pultrusion (straight out of the die and toward the grippers), and 11 layers of 90 degree material spaced at various locations within the ply schedule.

Although the panel referenced above was successfully pultruded, other types of composite material cross sections present different challenges. For example, there is a need to pultrude very thin sections of composite material that may have only 2, 3, or 4 layers of thermoplastic tape, some of which may be at 0 degree orientation, 45 degree orientation, 90 degree orientation, or any other angle relative to the 0 degree pultrusion direction. These thin materials have the same type of surface friction in the die as a thicker section, but it has been shown that the strength of a 1, 2, 3, or 4 layer composite material pultrusion, where each layer is approximately 0.010 inches thick, is much lower proportionally than a pultrusion of 32 layers of tape, for example. Care must be given to place the die thickness at just the proper gap (known as cavity gap) to achieve excellent pultrusion results. There is much more forgiveness in the die cavity gap in a 32-layer composite material pultrusion at 0.303 inches than in a 4-layer composite material pultrusion at 0.040 inches, for example.

Additionally, there is a need to pultrude thermoplastic tapes over other core materials, creating a sandwich material. As used herein, core materials can include, but are not limited to, wood, metal, ceramics, foam, foam combined with composites, honeycomb, balsa, and any combinations of the same. As examples, sandwich materials can alternate between the thermoplastic tapes and metals that are rigid, the thermoplastic tapes and ceramics, or the thermoplastic tapes and alternating high strength fibers/fiber fabrics to achieve very high ballistic performance. The outside surface of the sandwich panels may need, for example, fabric, film, appliqué, dry paint film, or any other laminating type surfacing material(s). The sum total of these combinations result in an infinite set of combinations of material layers and sandwich thicknesses.

These core materials present their own unique set of challenges. For example, many times these core materials have high compressive strength, and if the thickness is not controlled, a processing problem can occur. In pultrusion sandwich processing, with a variable thickness core, either the core material must compress or, in some cases, crush. If the core material does not crush, the pultruded skin material will jam in the die and the process will be stopped. Often, these core materials are impossible to crush or compress. Accordingly, there is a need for a process that can achieve pultrusion of skins with thermoplastic tape skins and core materials of high compressive strength such as, but not limited to, foam, honeycomb, balsa wood, OSB, and plywood. All of these core materials can be sanded, planed, or shaped to a very tight tolerance, but these processes can be costly. A need exists for a pultrusion system and method for pultruding varying thickness thermoplastic composites with tolerance for variable core thicknesses.

Additionally, a need exists for achieving very high surface finishes and preventing sloughing of 90 degree tape in the die when thin pultrusions are run. Sloughing is the tendency for the 90 degree fiber to arc backwards toward the entrance of the die, and is usually pronounced on the edges of a panel, for example. Sloughing is usually caused by retarding-frictional forces that are encountered in thin panels with only nominal 0-degree layers of tape.

SUMMARY OF THE INVENTION

Accordingly, an aspect of the invention involves a unique and new system and method of pultruding a composite material such as thermoplastic tape in order to achieve a high efficiency in manufacturing of thermoplastic composites.

An additional aspect of the invention involves a thermoplastic pultrusion die system for pultruding a thermoplastic composite. The thermoplastic pultrusion die system includes a first pultrusion die member; a second pultrusion die member; a die cavity gap formed between the first pultrusion die member and the second pultrusion die member; and a die cavity gap adjustment mechanism that imparts movement to at least one of the first pultrusion die member and the second pultrusion die member to vary the die cavity gap within a die cavity gap tolerance of no more than +/−0.0001 inches.

Another aspect of the present invention, which incorporates computer numerical controls (CNC) for precise servo motion control, enables the die to be adjusted according to die pressure to achieve optimum performance.

An additional aspect of the invention involves an advanced process referred to herein as "pull-pression" as it is a combination of pultrusion and compression molding. A computer controlled system in which the die cavity gap can be controlled, and changed, can be adapted to synchronous and sequential pulling and compression of the thermoplastic composite.

A further aspect of the invention involves a thermoplastic pultrusion die system and method including a pultrusion die cavity that is actively changed via CNC actuation of a servo motor and ball screw, a stepper hydraulic cylinder, or any servo forcing system capable of precise actuation, high force, and rapid movement. The die cavity gap is capable of being altered in very small amounts while preventing resin (in a molten state within the die) from leaking or being squeezed from the die cavity gap at variable edges.

Typical temperatures of processing may not cause leakage of high viscosity resin and no seal would be required for the die cavity gap on the sides. However, for other applications, the thermoplastic resin may achieve a high viscosity state, and in these cases, a seal may be required. Leakage of resin at the variable edges is prevented due to a silicone seal, a material that has adequate temperature resistance for the process, good compression characteristics, good recovery-from-compression characteristics, and excellent stretch characteristics as well. The silicone is the ideal material for allowing variable die cavity gaps and sealing the die from resin leakage.

Although a flat silicone material is shown and described herein, in alternative embodiment, round silicone seals (or other-shaped/configured silicone seals) would be adequate (e.g., O-ring-material-cross sections). Besides silicone, there are other rubbers and elastomers that could be used by those skilled in the art. In some cases, it is desirable to run thermoplastic tape die temperature to a point where the thermoplastic does not freely run to the edges of the part. In these cases, the seal is not necessary.

Although the examples provided herein are for flat composite material panels, in alternative embodiments, the same general type of system and process is used for complex shapes where a series of die shapes are moved both toward and/or away from an internal center of gravity (CG) of the part. By doing this, other shapes besides flat panels may be pultruded in an adapted version of the thermoplastic pultrusion die system and method described herein. Additionally, with enough actuation points and servo forcing points, nearly any die cavity shape can be adjusted.

Die cavity gap tolerances must be very tight in order to achieve proper consolidation, surface finish, and error-free processing. Typical die surface tolerances are in the range of 0.001 to 0.002 inches. Chroming of a die can add to the difficulty of manufacturing a die to the nearest 0.0001 inches. A die cavity gap tolerance of +/−0.0001 inches is impossible to commercially attain at the time of this writing. However, a die cavity gap tolerance of +/−0.0001 inches is necessary for successful pultrusion of certain thermoplastic composites, whether they be thin or consist of thick-skins with difficult core materials of high density and/or inconsistent thickness.

The thermoplastic pultrusion die system and method of the present invention allows a very close tolerance on the die cavity gap for steady-state pultrusion of thermoplastic composite tape. This will assist start-up of the process (where low friction in the die is an important factor), and it will especially assist with splicing of tapes, where sometimes a ply may have to be overlapped (adding an extra 0.010 inches or so, to the material thickness). This addition of 0.010 inches to a four-layer pultrusion at 0.040 inches would normally prove disastrous and stop the pultrusion process. However, with the thermoplastic pultrusion die system and method of the present invention, computer sensing of various conditions alert servo-actuation motors that the die cavity gap must be temporarily opened up. Accordingly, disaster can be averted (in the industry, the term "crash" is used to describe a stopping of the pultrusion process due to the jamming in the die of excess material). Also, the computer can initiate a laser mark identifying the location on the pultrusion where the part had a thickness-anomaly. If required by specifications, that section having the thickness-anomaly could be scrapped.

In an aspect of the thermoplastic pultrusion die system and method of the present invention, a series of actuation devices are computer controlled to achieve very accurate die cavity gaps for purposes as mentioned above. These actuation devices can have load measuring devices referred to herein as load cells that sense composite processing pressure. Load can be applied by, for example, servo motors with actuators or CNC hydraulic cylinders that have a maximum pressure setting. The maximum pressure setting, which can be variable and programmed, serves as the equivalent of a load cell. The control can rapidly change the die cavity gap in the "more-opened" direction or the "more-closed" direction as the load cell actively relays internal part pressure. This accuracy is dependent upon calibrations, which are known to those skilled in the art. This control can actively sense a design pressure and a goal-processing-load, and actively adjust the die cavity gap to achieve the same. If, for example, a pressure of 100 psi is desired, the process is designed to sense the exact moment the 100 psi pressure is achieved, and then the die cavity can be immediately opened up. The grippers can step the part forward an incremental distance, then stop, and the die cavity can be actuated closed to the 100 psi control point. Then, the entire process is repeated.

Additionally, in an alternative embodiment, the control system is tied into the sensing of pultrusion load from the grippers. The pultrusion grippers each have load measuring load cells. Accordingly, the computer can be programmed with software to actively watch the load cells feeding the die internal pressure information and the grippers relaying the frictional forces and loads as determined by the gripper load cells. Accordingly, the computer will be able to command die cavity gaps that are optimum for each moment in time of the pultrusion process.

In a further aspect of the invention, this capability is taken one step further. The thermoplastic pultrusion die system and method allows for temporary halting of the pultrusion direction as the grippers are another set of accurate axes of motion control. This halting can coincide with a very high compression force, actuated by the computer software. The purpose of this halting of gripper motion (and speed) and of the very high compressive force is to use the die cavity gap as a temporary compression molding die. This very high pressure may be one that exceeds the frictional capability of the pultrusion process. Then, after a defined period of time, the die cavity gap can be actuated and commanded to a larger gap position while the grippers start up again. As this part of the cycle occurs, easy release of the material in the die occurs. The composite is pulled with low friction and new material is allowed to enter the die cavity gap at low friction. As a result, the material, especially in thin parts, does not allow for sloughing of material (e.g., 90 degree tape). Therefore, an easy and defined entry into the die cavity is attained. The process is continued (the grippers stop pultruding, die cavity gap is closed to a very high pressure, and so on). This process described above can be so rapid that to an ordinary observer the process may look like the pultrusion rate of processing is at a steady speed when, in fact, that is not the case.

Furthermore, in addition to the above, a belt of finite length or an endless strap or band made of, for example, Teflon, steel, coated steel, high temperature PEEK, or any suitable band material, as described in Lambing, et al., U.S. Pat. No. 5,264,060, which is incorporated by reference herein, can be incorporated into the thermoplastic pultrusion die system and method in order to prevent any residue of thermoplastic material attaching to the die surface. The enhanced features of the thermoplastic pultrusion die system and method disclosed herein are a significant improvement to the invention of Lambing, et al. in that no pultrusion die utilized by Lambing, et al. would be able to accommodate the high friction that would result from varying thicknesses of pultrusion thermoplastic tape/core build-ups. The thermoplastic pultrusion die system and method of the present invention actually enables the certain embodiments of Lambing, et al. to be successful over a wide range of varying materials without jamming in what is otherwise a conventional die.

If a core material such as wood and a raised knot enter, the thermoplastic pultrusion die system and method sense this and the die cavity gap can be instantly opened slightly to accommodate the anomaly (Lambing, et al, can not allow this). This thermoplastic pultrusion die system and method of the present invention allows for very precise and rapid cycling (high frequency cycling) of the maximum and minimum die cavity gap positions in order allow for the easy entry, partial compression molding, and continuous operation of the grippers. In this situation, the gripper speed can be maintained as constant and frictional forces are optimized around the high frequency adjustments. This rapid adjustment blends the process of pultrusion and compression molding, and thus the word "pull-pression" has been coined for this aspect of the system and method of the present invention.

A further aspect of the invention involves a thermoplastic pultrusion die system for pultruding a thermoplastic composite. The thermoplastic pultrusion die system includes a first pultrusion die member with a curved, spherical, concave top surface; a second pultrusion die member with a curved, spherical convex bottom surface; a curved die cavity gap formed between the a curved, spherical concave top surface of the first pultrusion die member and the curved, spherical convex bottom surface of the second pultrusion die member; a die cavity gap adjustment mechanism that imparts movement to at least one of the first pultrusion die member and the second pultrusion die member to vary the die cavity gap from closed to a specified location to open at a specified location; a pultrusion gripper mechanism having one or more grippers in series, and a computer numerical control (CNC) computer system controlling the die cavity gap adjustment mechanism.

One of more implementations of the above aspect of the invention include one or more of the following: the system further includes a belt material at both the first pultrusion die member and the second pultrusion die member that is fed between the first pultrusion die member and the thermoplastic composite material, and the second pultrusion die member and the thermoplastic composite material, wherein the belt material is a release material; the die cavity gap adjustment mechanism includes one or more servo motors; the computer numerical control (CNC) computer system is a CNC controller for precise servo motion control of the die cavity gap adjustment mechanism includes for precise control of the die cavity gap; the die cavity gap adjustment mechanism includes one or more ball screws rotatably driven by the one or more servo motors; the die cavity gap adjustment mechanism includes one or more physical stops; the die cavity gap adjustment mechanism includes one or more hydraulic cylinders with a maximum pressure setting; the first pultrusion die member and the second pultrusion die member are part of a series of pultrusion die members, one or more of which move towards and away a center of gravity of the thermoplastic composite material for thermoplastic pultrusion of a part; the computer numerical control (CNC) computer system controls the die cavity gap adjustment mechanism to control the die cavity gap based on at least the thickness of the thermoplastic composite material and one or more thickness anomalies in the thermoplastic composite material; the system includes one or more sensors to sense composite processing pressure; the one or more sensors include one or more load cells; the one or more sensors include one or more gripper load cells associated with the pultrusion gripper mechanism for sensing at least one of frictional forces and loads associated with pultrusion by the system; the means for preventing the die cavity gap from being less than a predetermined-position compression distance include CNC hydraulic cylinders; the CNC computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved; the CNC computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved, allowing higher-thickness pre-preg thermoplastic materials to be processed by the thermoplastic pultrusion die system without crashing the pultrusion process and whereby the higher-thickness pre-preg thermoplastic materials entering the thermoplastic pultrusion die system being thicker than cured thermoplastic materials exiting the thermoplastic pultrusion die system; the CNC computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved, wherein the thermoplastic pultrusion die system includes a heater, a consolidation-under-pressure zone, and a length to allow heating of the thermoplastic composite prior to the consolidation-under-pressure zone, allowing faster processing speeds; the CNC computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved, wherein the one or more computer programmed module elements configured to consolidate the thermoplastic composite in the consolidation-under-pressure zone under a hot melt condition at the inlet end with the heating elements and consolidate the thermoplastic composite in the consolidation-under-pressure zone under a cold solid condition at the exit end with the cooling elements before exiting the consolidation-under-pressure zone; the convex and concave surfaces and die members are reversed, such that the spherical resultant panel exiting the die members curves in a downward direction.

A further aspect of the invention involve a thermoplastic pultrusion die system for pultruding a thermoplastic composite, comprising: a first pultrusion die member with a curved, cylindrical, concave top surface; a second pultrusion die member with a curved, cylindrical convex bottom surface; a curved die cavity gap formed between the a curved, cylindrical concave top surface of the first pultrusion die member and the curved, cylindrical convex bottom surface of the second pultrusion die member; a die cavity gap adjustment mechanism that imparts movement to at least one of the first pultrusion die member and the second pultrusion die member to vary the die cavity gap from closed to a specified location to open at a specified location; a pultrusion gripper mechanism having one or more grippers in series, and a computer numerical control (CNC) computer system controlling the die cavity gap adjustment mechanism.

One of more implementations of the above aspect of the invention include one or more of the following: the system further includes a belt material at both the first pultrusion die member and the second pultrusion die member that is fed between the first pultrusion die member and the thermoplastic composite material, and the second pultrusion die member and the thermoplastic composite material, wherein the belt material is a release material; the die cavity gap adjustment mechanism includes one or more servo motors; the computer numerical control (CNC) computer system is a CNC controller for precise servo motion control of the die cavity gap adjustment mechanism includes for precise control of the die cavity gap; the die cavity gap adjustment mechanism includes one or more ball screws rotatably driven by the one or more servo motors; the die cavity gap adjustment mechanism includes one or more hydraulic cylinders with a maximum pressure setting; the first pultrusion die member and the second pultrusion die member are part of a series of pultrusion die members, one or more of which move towards and away a center of gravity of the thermoplastic composite material for thermoplastic pultrusion of a part; the computer numerical control (CNC) computer system controls the die cavity gap adjustment mechanism to control the die cavity gap based on at least the thickness of the thermoplastic composite material and one or more thickness anomalies in the thermoplastic composite material; the system includes one or more sensors to sense composite processing pressure; the one or more sensors include one or more load cells; the one or more sensors include one or more gripper load cells associated with the pultrusion gripper mechanism for sensing at least one of frictional forces and loads associated with pultrusion by the system; the means for preventing the die cavity gap from being less than a predetermined-position compression distance include CNC hydraulic cylinders; the CNC computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved; the CNC computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved, allowing higher-thickness pre-preg thermoplastic materials to be processed by the thermoplastic pultrusion die system without crashing the pultrusion process and whereby the higher-thickness pre-preg thermoplastic materials entering the thermoplastic pultrusion die system being thicker than cured thermoplastic materials exiting the thermoplastic pultrusion die system; the CNC computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved, wherein the thermoplastic pultrusion die system includes a heater, a consolidation-under-pressure zone, and a length to allow heating of the thermoplastic composite prior to the consolidation-under-pressure zone, allowing faster processing speeds; the CNC computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved, wherein the one or more computer programmed module elements configured to consolidate the thermoplastic composite in the consolidation-under-pressure zone under a hot melt condition at the inlet end with the heating elements and consolidate the thermoplastic composite in the consolidation-under-pressure zone under a cold solid condition at the exit end with the cooling elements before exiting the consolidation-under-pressure zone; the convex and concave surfaces and die members are reversed, such that the spherical resultant panel exiting the die members curves in a downward direction.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

With reference to FIG. 1-8, an embodiment of a thermoplastic pultrusion die system ("system") 300 and method of processing using the same will be described.

Figure 1A:
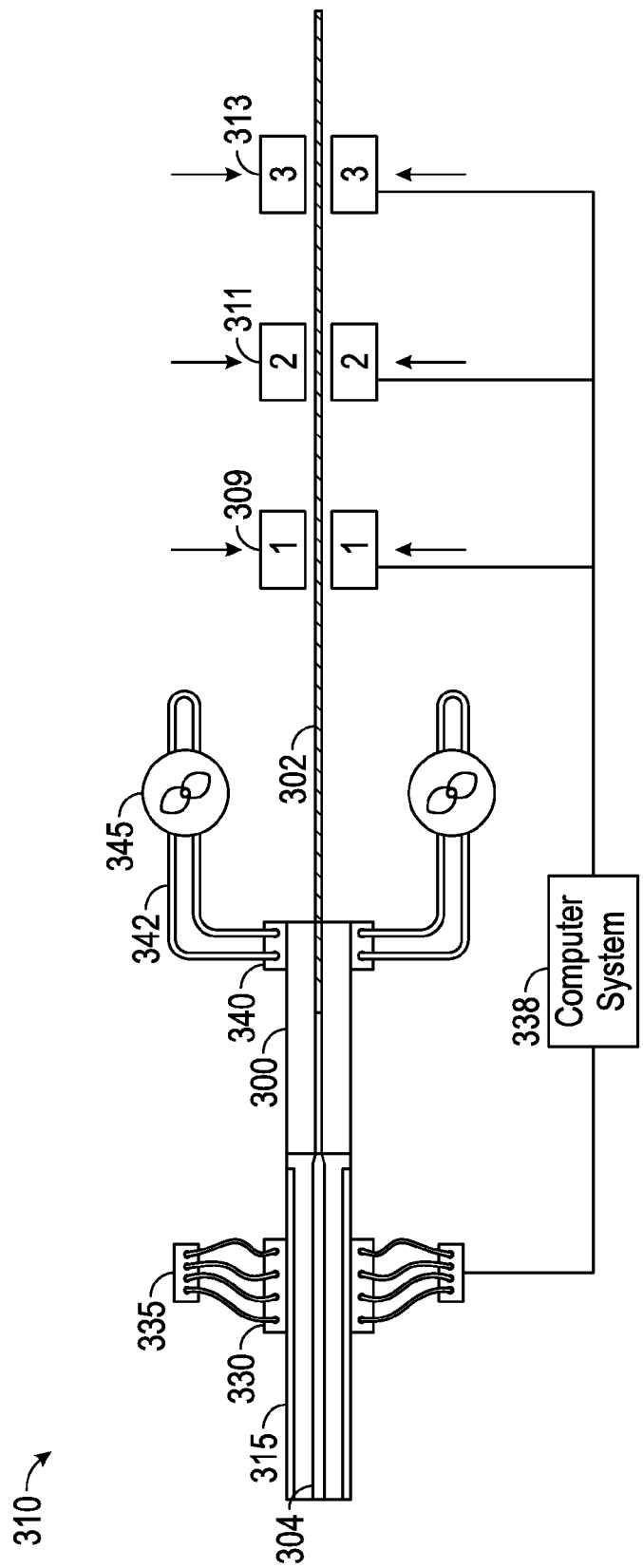
FIG. 1A is a diagram of an embodiment of an exemplary thermoplastic composite tape pultrusion process in which the thermoplastic pultrusion die system and method of the present invention may be incorporated into in one application.

With reference to FIG. 1A, before describing the system 300, an embodiment of an exemplary thermoplastic composite tape pultrusion processing assembly 310 and method that the thermoplastic pultrusion die system 300 and method may be a part of will first be described.

In the thermoplastic composite tape pultrusion processing assembly 310, the pultrusion process moves from left to right. From left-to-right, the assembly 310 includes a tunnel oven 315, the thermoplastic pultrusion die system 300, and a pultrusion gripper mechanism including one or more grippers (e.g., one, two, three) 309, 311, 313 in series. In FIG. 1A, a fairly short thermoplastic pultrusion die system 300 is shown, but in actuality the thermoplastic pultrusion die system 300 may extend forward in the process 20 feet or more to assist with heating of multiple tapes or plies of thermoplastic tape to achieve faster line speeds on the processing.

The one or more grippers 309, 311, 313 pull a solid part 302 from the thermoplastic pultrusion die system 300 by clamping and pulling in a hand-over-hand method, using either a combination of one, two or three grippers at a time. In an alternative embodiment, a mechanical motive transmitter other than one or more grippers is used such as, but not by way of limitation, nip rollers or a caterpillar dive system.

Raw material 304 includes a composite material including one or more thermoplastic composite tapes entering the thermoplastic pultrusion die system 300. Before raw material 304 enters the thermoplastic pultrusion die system 300, upstream of the thermoplastic pultrusion die system 300, the thermoplastic composite tapes are preheated in a pre-heating mechanism (e.g., tunnel oven) 315, which can be heated to a temperature just below a melt temperature of the thermoplastic resin of the thermoplastic composite tapes.

As the pultruded tape material exits the thermoplastic pultrusion die system 300, it is chilled and consolidated, as represented by the solid part 302. The transition from a series of individual thermoplastic composite tapes to the solid part 302 takes place in the thermoplastic pultrusion die system 300.

The thermoplastic pultrusion die system 300 preferably includes a heating mechanism (e.g., heater or hot zone) in the front of the thermoplastic pultrusion die system 300 heated by platens 330 using a series of heaters and controllers 335. At an end of thermoplastic pultrusion die system 300, just before the pultruded tape material exits, is a cooling mechanism (e.g., cooler or chilling zone) provided by chilling platens 340, which are physically attached to thermoplastic pultrusion die system 300. The platens 340 have a cooling water circuit 342 designed to carry cooling fluids such as water to a radiating system, shown here with a fan 345. In alternative embodiments, alternative heating mechanisms and/or cooling mechanism may be used with the thermoplastic pultrusion die system 300. A computer system 338 controls one of more of the components of the assembly 310.

Figure 1B:
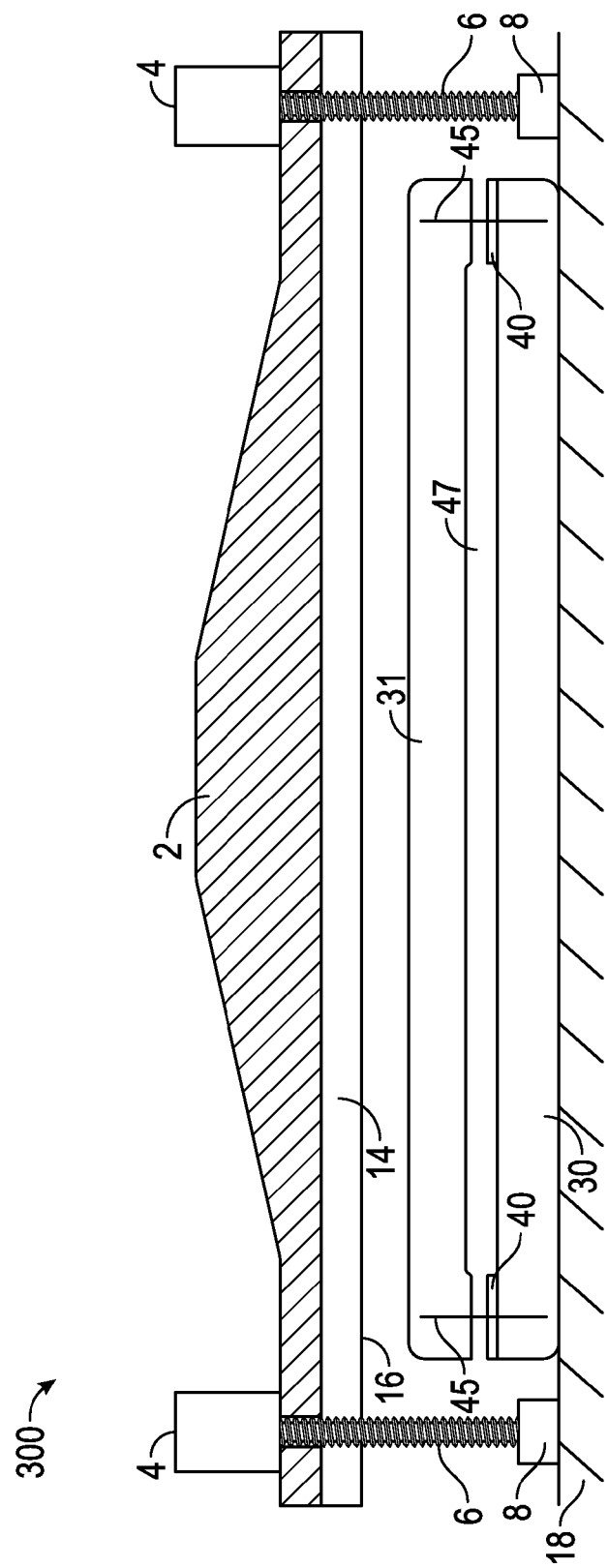
FIG. 1B is a side elevation view of an embodiment showing an end of a die and die cavity gap (end being defined as the exit of the die as one would view the die system from the position of the pultrusion grippers) of an embodiment of the thermoplastic pultrusion die system and method.

With reference to FIG. 1B, the thermoplastic pultrusion die system 300 is a die, platen, and frame arrangement. The thermoplastic pultrusion die system 300 is shown in elevation in FIG. 1B as if viewing from the pultrusion grippers 309, 311, 313 towards the downstream end of the thermoplastic pultrusion die system 300.

The thermoplastic pultrusion die system 300 includes a die bottom 30 (supported by a lower support 18) and a die top 31 separated by a die cavity gap 47. The die top 31 is bolted to the die bottom 30 at bolt holes 45. Along opposite edges of the die bottom 30 and die top 31 are elongated, narrow flat silicone seals 40. Load cells 8 are supposed by the lower support 18 are measure the load pressure at various locations in the thermoplastic pultrusion die system 300. The load cells 8 are operably coupled to CNC servo motors 4 via ball screws 6. A strongback 2 and a platen 14 move with rotation of the ball screws (and are associated with the die top 31 and/or die bottom 30) to increase or decrease the die cavity gap 47.

FIG. 1B shows the assembly of the die halves with the silicone seal 40 and the ball screws 6 with servo motors 4 and load cells 8, as one would view the system 300 prior to connecting the die top 31 to the silicone seal 40 and prior to actuating the platen 14 and the strongback 2 into intimate contact with the die top 31.

FIG. 1B illustrates the die cavity gap 47 at an exit end of the thermoplastic pultrusion die system 300. Once the die top 31 is bolted to the die bottom 30 at the bolt holes 45 shown on each the left and right hand sides of the die, then the die cavity gap 47 will be a closed cavity, but for the opening at the entrance of the die (not shown) and the opening at the exit (shown as 47 in FIG. 1B).

An important aspect of the present invention is the two pieces of silicone seal material shown as 40 on both sides of the system 300. Although the silicone seals 40 are shown as narrow, elongated strips of silicone material, in alternative embodiments, the silicone seals 40 may be any shape/configuration. For example, but not by way of limitation, the silicone seals 40 may be round and fit into somewhat circular slots of matting flanges of both die bottom 30 and die top 31. The bolts holding the die bottom 30 and the die top 31 together would pinch the silicone seal 40. In the embodiment shown, a thread is disposed in die bottom 30 and a slip fit in die top 31. The bolts can be tightened to give a maximum die cavity gap position and no more. The minimum die cavity position is attained by actuating the platen 14, which is shown raised above the die top 31, but would be brought down into intimate contact by way of the actuated ball screws 6 that are shown on each side of the thermoplastic pultrusion die system 300. Although only two ball screws 6 are shown in FIG. 1B, the thermoplastic pultrusion die system 300 may include 4 or more actuated ball screws 6.

The platen 14 is attached to the bottom of the strongback 2, which allows for a steady and well distributed downward force on the top of the thermoplastic pultrusion die system 300 when the ball screws 6 are actuated downward by the servo motors 4. The servo motors 4 are controlled by a CNC control system that command(s) a given position through sophisticated motion control including, but not limited to, commanded acceleration, deceleration, and soft reversal of torque and direction. When the downward force of the platen 14 depresses the silicone seals 40, there is additional resistance of the thermoplastic tape material, which is not shown in FIG. 1B for clarity, but would be in the entire die cavity gap 47. Since the silicone seals 40 are designed for high temperature and have good recovery after compression, the die cavity gap 47 remains sealed on the sides through the entire actuation cycle from maximum gap to minimum gap. The silicone seals 40 can stretch or be compressed up to 800% without loosing its/their elasticity.

Although the maximum die cavity gap 47 can be set by the bolts (in bolt holds 45), a more preferred method is the use of the load cells 8 at the end of ball screws 6 to give a measure of calibrated die pressure. If the weight of the die top 31 is great, it may be necessary in some cases to attach the die top 31 to the platen 14 and the strongback 2. In this way, absolute minimum material pressure can be achieved when the ball screws 6 are actuated upward. The goal will be to adjust the die cavity gap 47 to the proper height to achieve continuous pultrusion of thermoplastic composite laminates, and when the situation calls for it, the system 300 can actively alternate between pultrusion and cycling the die cavity gap 47, as well be described in more detail below.

Although the lower support 18 is shown as being fixed and secured to ground/not deflectable, in one or more alternative embodiments, the support 18 is similar to the platen 14 and the strongback 2. Thus, in one or more embodiments, the system 300 may include an upper movable die top/platen/strongback and/or a lower movable die top/platen/strongback.

Purposely not shown in FIG. 1B are the heating and cooling systems (they can generally be seen in FIG. 1A), which include a heating zone in the center and generally forward sections of the system 300, top and bottom, and with a cooling section toward the rear, or discharge end of the die, both top and bottom. Multiple coordinated controls may be used to control the system 300. If, for example, the system 300 of FIG. 1B had four ball screws 6 with four servo motors 4, the system 300 would include 4-axes of motion control. With the addition of three pultrusion grippers (See FIG. 1A), the system 300 would include a minimum of a 7-axis CNC system and process. The computer hardware and/or software to interface with this system 300 will be generally described below with respect to the exemplary computer system 550 described below with respect to FIG. 11.

Once the embodiment of FIG. 1A is provided as a system 300, with the CNC motion control, then the control schemes of FIGS. 2, 3, 4, and 5 can be implemented. There are reasons to consider each, which will depend on factors, such as, but not limited to, laminate thickness, laminate density, surface finish required, addition of foreign material (besides thermoplastic tape) including the wide variety of core materials such as, but not limited to, wood, concrete, gypsum, honeycomb, foam, and other foreign materials/cores that can be found in sandwich panel construction.

Figure 2:
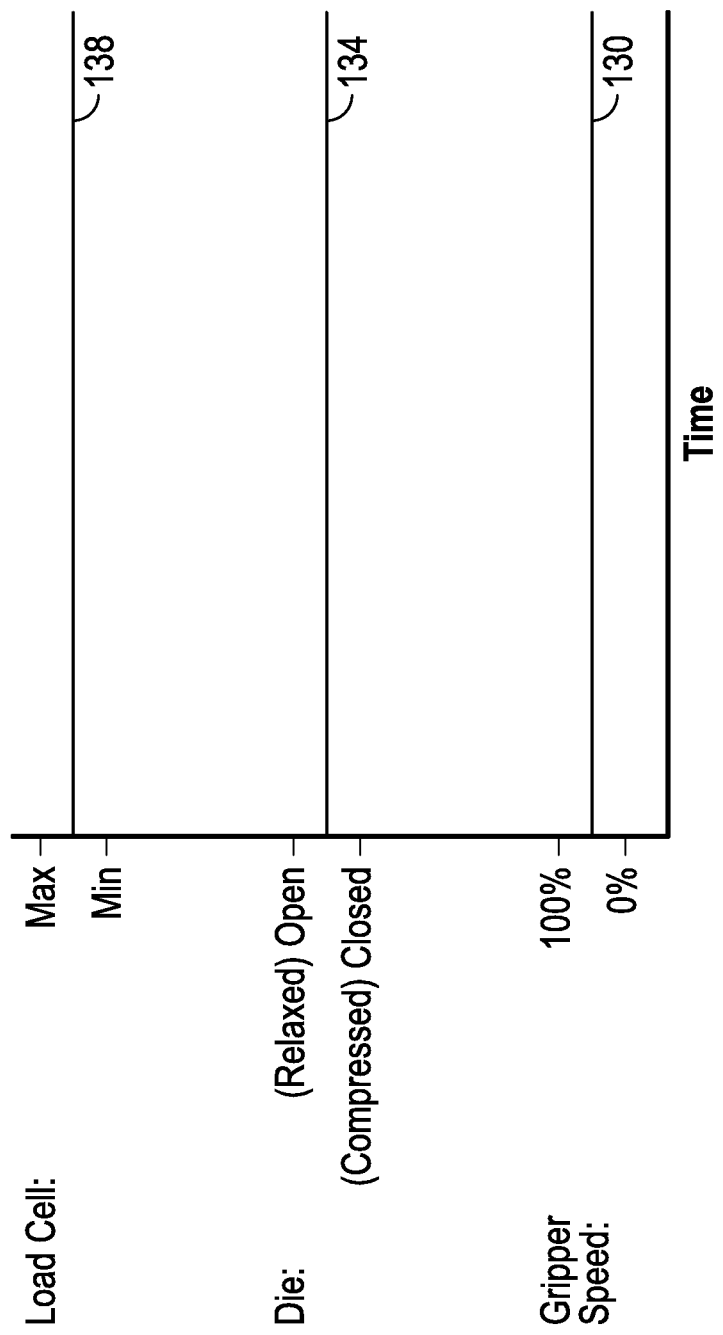
FIG. 2 is a graph showing how the embodiment of the thermoplastic pultrusion die system and method shown in FIG. 1B can operate steady state at some predefined load cell reading, which is a closed loop control and feedback on the opening of the die cavity gap, and synchronized with the pultrusion speed.

FIG. 2 shows the simplest control scheme for the system 300. Three different graphs are shown versus time. The units in time can be any as part of the pultrusion process. As shown in FIG. 2, the grippers 309, 311, 313 are shown running at a consistent speed 130 somewhere between their 100% design speed and 0% speed (stopped). The die cavity gap 47 is shown between some maximum specification gap and some minimum specification gap 134. The load cell reading 138 is showing an effective internal pressure via a constant load cell reading. This is similar to thermoplastic tape pultrusions run consistently with thick parts (0.303 inches in thickness and 32 layers of Polystrand thermoplastic tape). In such a case, the die thickness that was machined was perfect. However, had it not been perfect, the frictional forces would have been too high or the consolidation would have been too low. In cases where the die is not perfectly set to the correct die cavity gap, then the system 300 and method of the present invention can correct such a problem.

In the case of thin laminates, the adjustment of die cavity gap may be mandatory in achieving a perfect pultrusion. FIG. 2 simulates setting the die cavity gap to the perfect thickness, as judged by numerous criteria, as if a solid die was perfectly manufactured. The system 300 of the present invention is critical in reducing the costs of manufacturing and trial and error in making the perfect die. Accordingly, FIG. 2 represents a system that duplicates a perfect die cavity gap, and has an important other benefit. In start-up, it is necessary to open the cavity somewhat to make it easier to string-up the material at the start. Also, if splices ever are needed such as at the end of a pultrusion run, the pultrusion die system 300 can be slightly opened temporarily. If an anomaly occurs, the control system would catch the problem (such as the tape breaking at the inlet and suddenly having less volume). In this case, the load cell 8 on the die top 31 would catch a drop in consolidation pressures.

Figure 3:
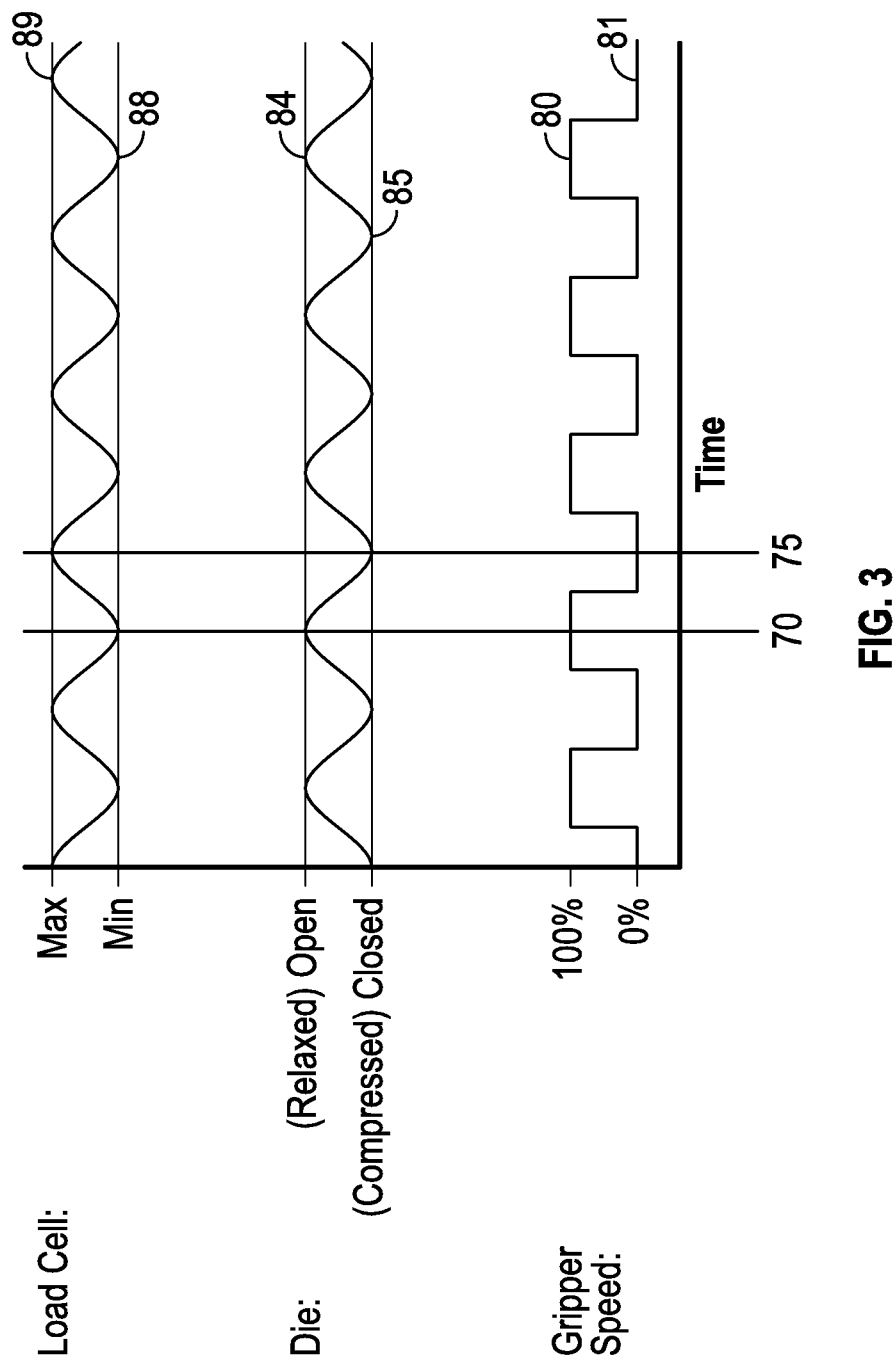
FIG. 3 is a graph similar to FIG. 2 in which a further embodiment is possible with the thermoplastic pultrusion die system and method. In this embodiment, the thermoplastic pultrusion die system and method allow for temporary halting of the gripper speed while high-compression forces are temporarily applied to the part.

FIG. 3 shows a variation in software control that can be provided with the identical system described with respect to FIG. 1. With thin laminates, it is sometimes necessary to prevent the sloughing of off-axis tapes, such as +/−30 degrees, +/−45 degrees, or 90 degrees. This sloughing is caused by tight die cavity gaps, minimum material and high frictional forces. The graph of FIG. 3 is similar to FIG. 2. The term "pull-pression" is coined for the combination of pultrusion and compression (molding) in this aspect of the present invention. It should be noted that two different moments in time are shown with the vertical lines 70 and 75.

Line 70 in FIG. 3 shows a point in time where the gripper 309, 311, 313 is pulling at 100% of design speed, indicated by 80. It is here where the die cavity gap 47 is most open or relaxed, as indicated by the peak in the curve 84. It so happens that the load cells 8 reading the die pressure will be at their lowest point 88.

As the grippers 309, 311, 313 move in a cycle, new raw material 304 is being pulled into the entrance of the pultrusion die system 300 and the finished composite part 302 is being pulled from the exit of the pultrusion die system 300. After a discrete unit of time, the grippers 309, 311, 313 suddenly stop and this occurs when the servo actuators apply commanded downward force on the die top 31 and the part is effectively undergoing compression. At this point, the grippers 309, 311, 313 are stopped at 0% speed 81 and the die cavity is compressed at cycle point 85 and the load cell(s) 8 indicate maximum compression 89.

It is at this point that the cycle repeats itself. At intervals, the material is in a relaxed condition and pulled into the pultrusion die system 300, then compressed at no speed, and then relaxed at 100% speed, and the process repeats itself. The pultrusion die system 300 starts out cold at the front (or partially heated below the melt point of the thermoplastic matrix). As the material moves its way down the pultrusion die system 300, it encounters a hot zone designed to completely melt and consolidate the part under pressure, and then further down towards the die exit, the material is chilled or cooled and it is finished with its consolidation and eventually exits the cooled die as a finished section.

Figure 4:
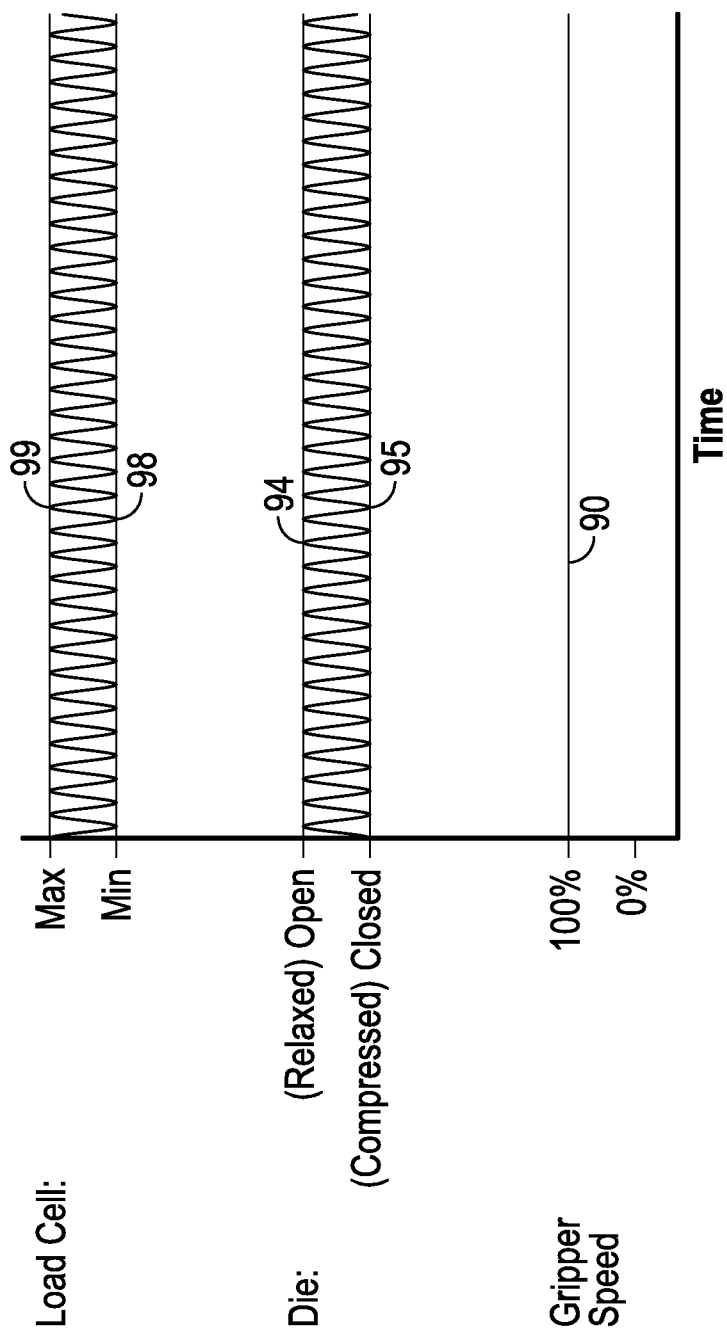
FIG. 4 is a graph similar to FIG. 3, except that in this embodiment of the thermoplastic pultrusion die system and method a rapid servo control and high frequency of the change in die cavity gap occurs in a manner that does not require the grippers to be stopped.

FIG. 4 is similar to FIG. 3. It should be noted that, in FIG. 4, there are peak load cell readings 99 associated with the most compressed die locations 95. Likewise, there are minimum load cell readings 98 that correspond to relaxed positions on the die gap 94. Shown in FIG. 4 is a very high cyclic alternate actuation of servo controls to achieve this rapid movement and the numbers could amount to several per second, with the limitations of the actuation system and the ball screw travel. In this case, a small fraction of time allows the pultrusion speed to stay constant and follow steady pultrusion speed. Using the system 300 and method of the present invention, trial and error can be used to determine the optimum control sequence.

Figure 5:
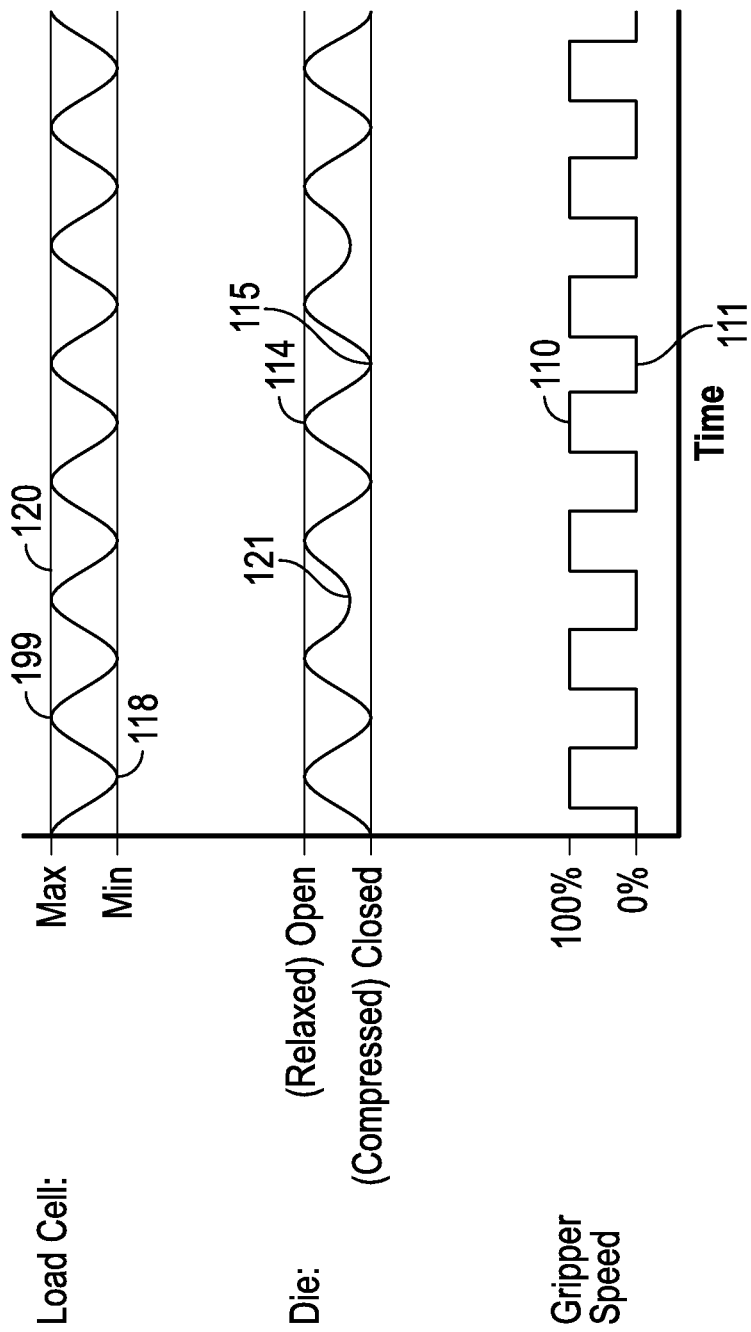
FIG. 5 is a graph similar to FIG. 3, and shows how the thermoplastic pultrusion die system and method could react to an anomaly such as a splice, a knot in a wood core, or other disruption causing excessive die pressures.

FIG. 5 is similar to FIG. 3, except in FIG. 5 the control interrupts a compression event 121 when some interference (e.g., a thicker core or skin material) has entered the pultrusion die system 300 and now the full compressed location 115 of the die cavity cannot be achieved as the load cell reading alarms the control system that maximum die pressure has occurred early in the compression cycle. In this case, the actuators will not complete the compression until the load has returned to an acceptable level.

Figure 6:
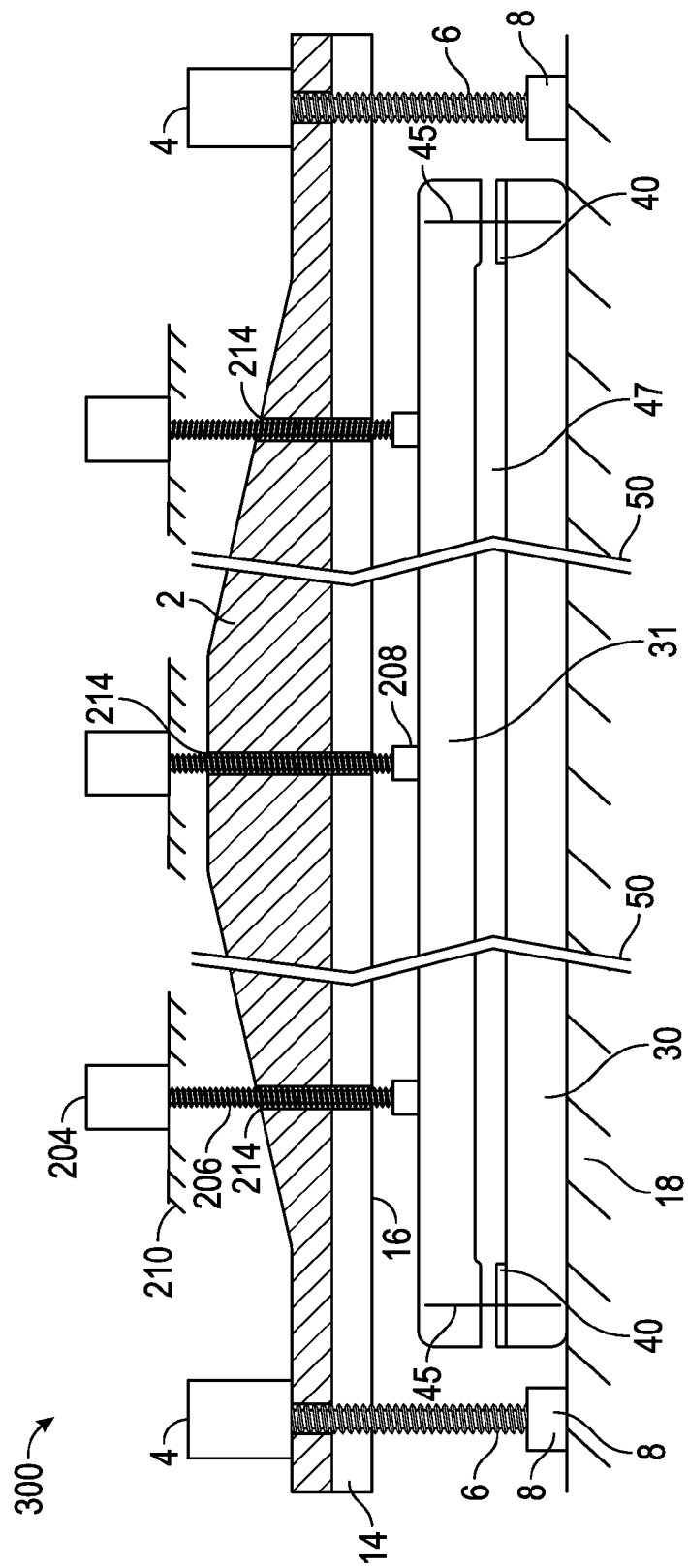
FIG. 6 is a side elevation view similar to FIG. 1B of an alternative embodiment of a thermoplastic pultrusion die system and method with multiple CNC type servo actuators and load cells installed over a very wide die top, a very wide plate, and a very wide strongback.

In many large pultrusion die systems, producing panels continuously and up to as much as 14 feet in width, it is difficult to pressure the material and keep the die surfaces at the same gap in the middle of the pultrusion die system 300 as the edges. In this case, as shown in FIG. 6, the lines 50 are break lines and indicate a much wider die than shown. A sample of an adjunct ball screw 206, load cell 208, and servo motor 204 are shown. This is shown inside a hole 214 which has been placed in the strongback, 2 and the plate 14. For a very wide pultrusion die system 300, there may be several of these placed every 1, 2, 3, or 4 feet (or other distance) apart across the width of the pultrusion die system 300 and these are there to achieve the same purpose as elements 4, 6, and 8 in FIG. 6. These multiple actuators could allow for controlling die cavity gaps in the center of a wide, flat die, in which any pressure would want to slightly open up the gap, due to hoop stress forces. There is a need for active CNC control of the die cavity gap 47 over the entire panel width, and this will be especially important in thin and wide thermoplastic composites manufactured from the tapes described herein.

Figure 7:
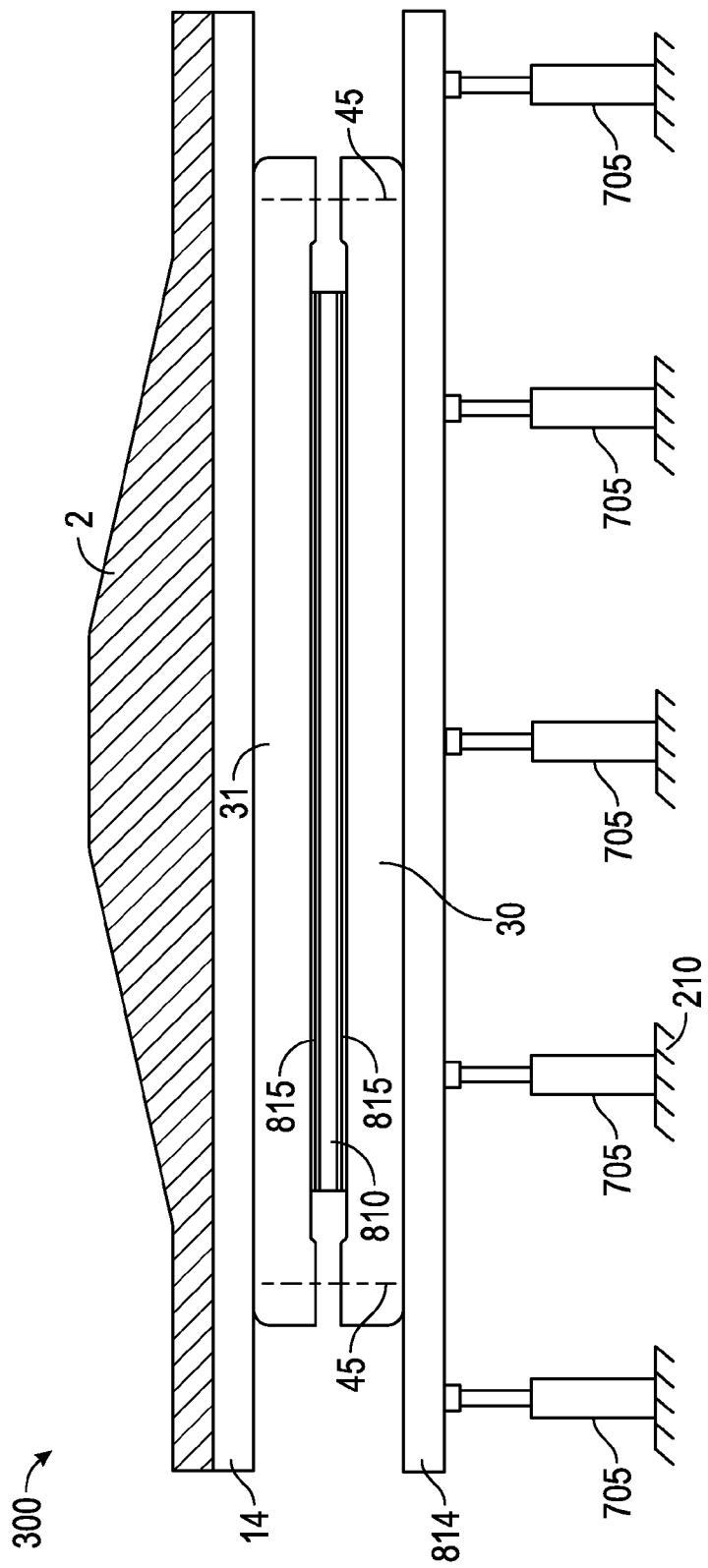
FIG. 7 is a side elevation view similar to FIG. 6 of an alternative embodiment of a thermoplastic pultrusion die system and method, except that the CNC motors and actuators have been replaced with servo CNC hydraulic cylinders and a sandwich panel is shown.

FIG. 7 is a side elevation view similar to FIG. 6 of an alternative embodiment of a thermoplastic pultrusion die system and method, except that the CNC motors and actuators have been replaced with servo CNC hydraulic cylinders 705. Also shown is a sandwich panel in a compressed state, with skins 815 and core 810, in the compressed state as if the full design pressure had been applied through the cylinders 705.

The servo-controlled hydraulic cylinders 705 can alternately close and open the die cavity. When closing, the die cavity can move to a position in which a given pressure is applied to the composite materials, which if, for example, a 100 psi pressure is required and if cylinder(s) 705 were incorporated into a centers-of-equal area, then one square foot, or 144 square inches, requiring 100 psi, would mean a 4 inch diameter cylinder 705 would operate at 1146.5 psi operating pressure. In other words, a single 4-inch cylinder 705 has 12.56 square inches of area, and at 1146.5 psi will deliver 14400 lbs., which is exactly 100 psi of laminate die pressure over one square foot. Further to FIG. 7, the hydraulic cylinders 705 are intended to supply force at the centers-of-equal area. As indicated above, the strong-back 2 supports the upper platen 14, wherein the lower platen 814 has hydraulic cylinders 705 pressing on same and reacted by the ground 210. The die top 31 and die bottom 30 are shown in a compressed state, and as shown there is no need for bolts 45 to attach to the die upper and lower sections.

Figure 8:
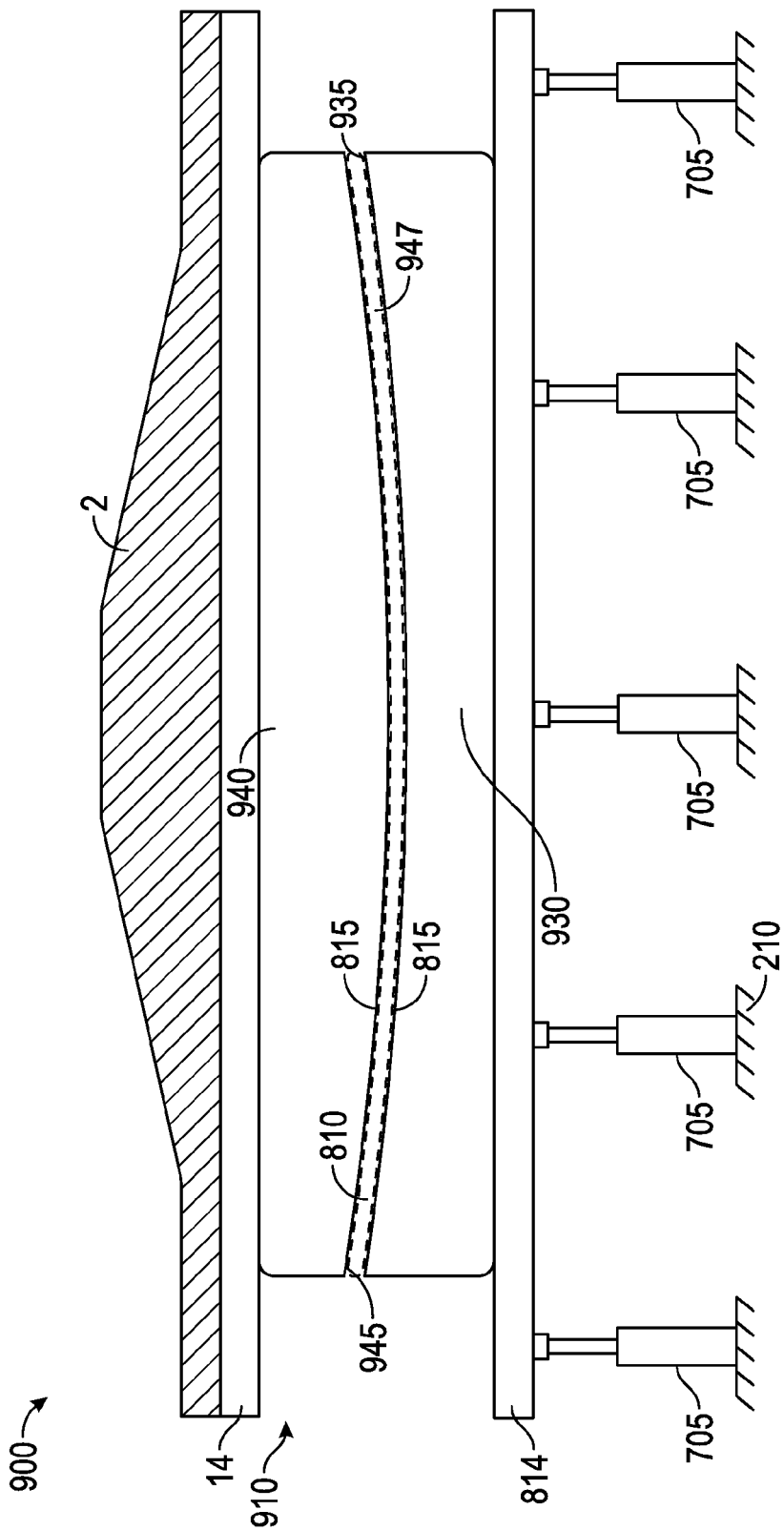
FIG. 8 is a side elevation view similar to FIG. 7 of a further embodiment of a thermoplastic pultrusion die system and method, except that the interior of the die is spherically curved.

FIG. 8 is a side elevation view similar to FIG. 7 of an alternative embodiment of a thermoplastic pultrusion die system 900 and method. The view of thermoplastic pultrusion die system 900 in FIG. 8 is of the exit of the die system 900, but a side view would show the same spherical shape (i.e., die system 900 has interior spherical curve in both longitudinal and lateral directions of die system 900, which manifests itself as an arc line when viewed, as in the case of FIG. 8 at just one edge of the spherical die) and, thus, look similar to that shown in FIG. 8. The above description and drawings of the thermoplastic pultrusion die systems and methods with respect to FIGS. 1-7 are incorporated herein and like elements are shown with like reference numbers.

Figure 9:
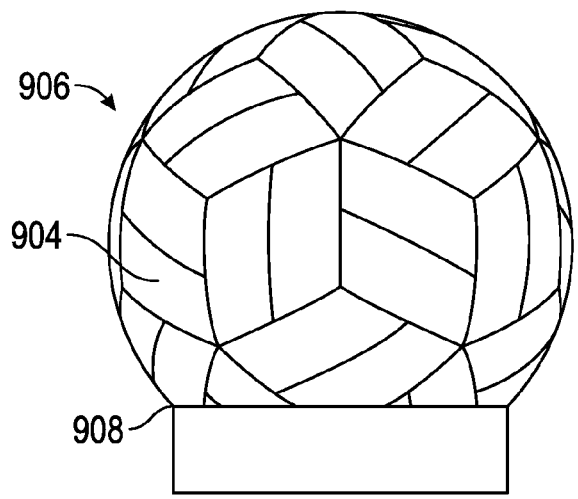
FIG. 9 is a perspective view of an embodiment of a rhombic triacontahedron composite radome.
Figure 10A:
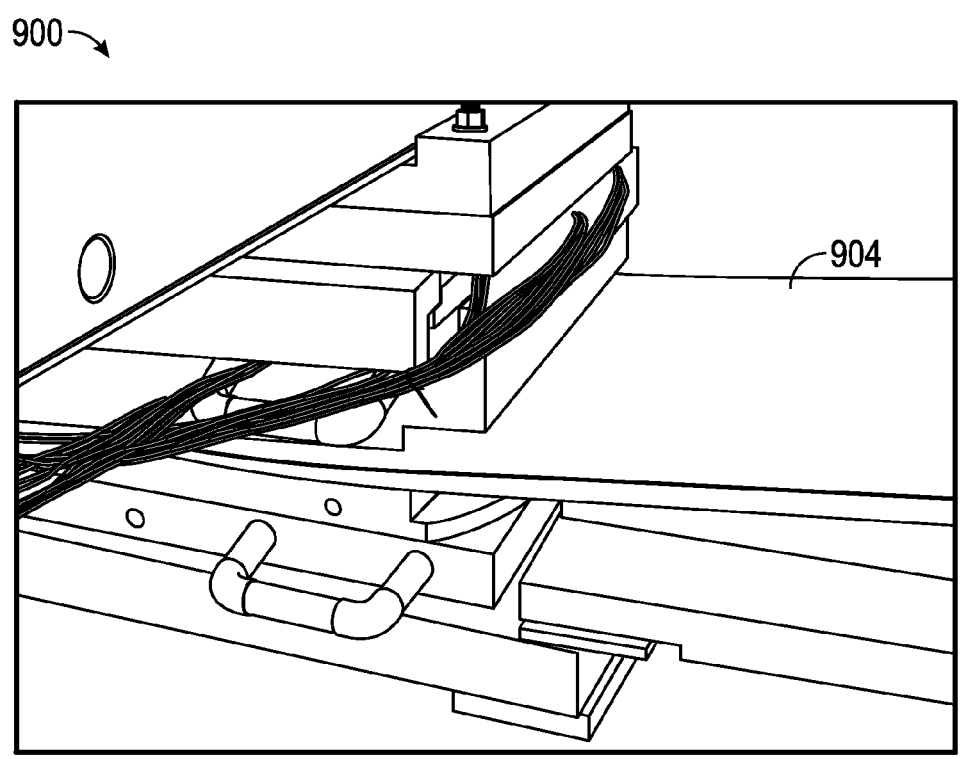
FIGS. 10A-10E are perspective views of different stages of spherical thermoplastic composite sandwich panels processed in a small spherical die similar to that as shown in FIG. 8 and exiting the die along the defined spherical path into curved spherical composite sandwich panels using the thermoplastic pultrusion die system of FIG. 8.
Figure 10B:
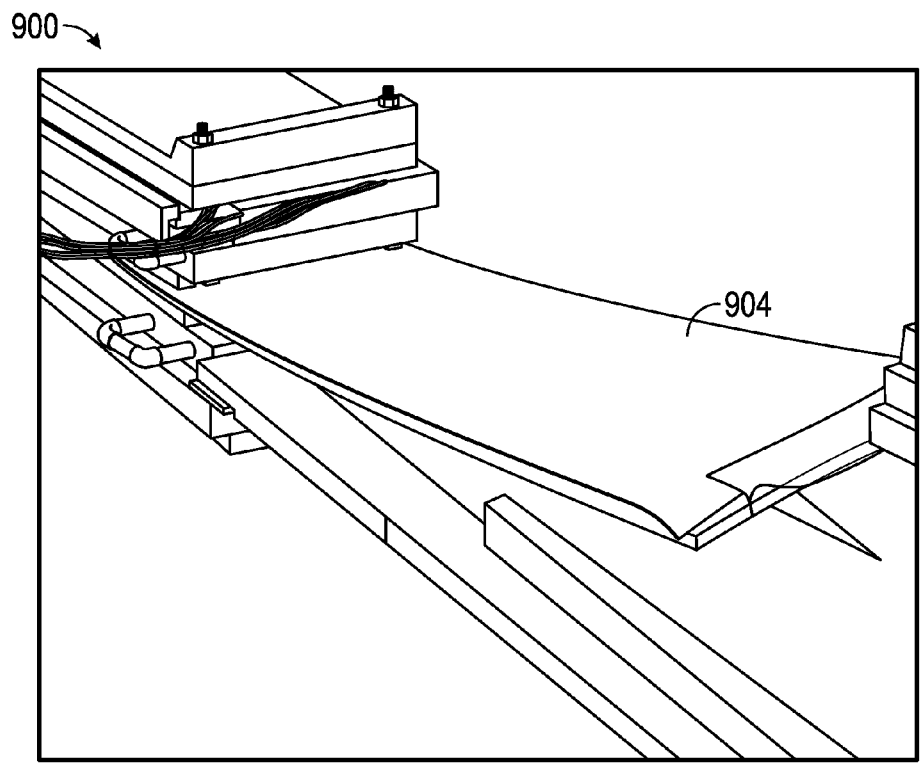
Figure 10C:
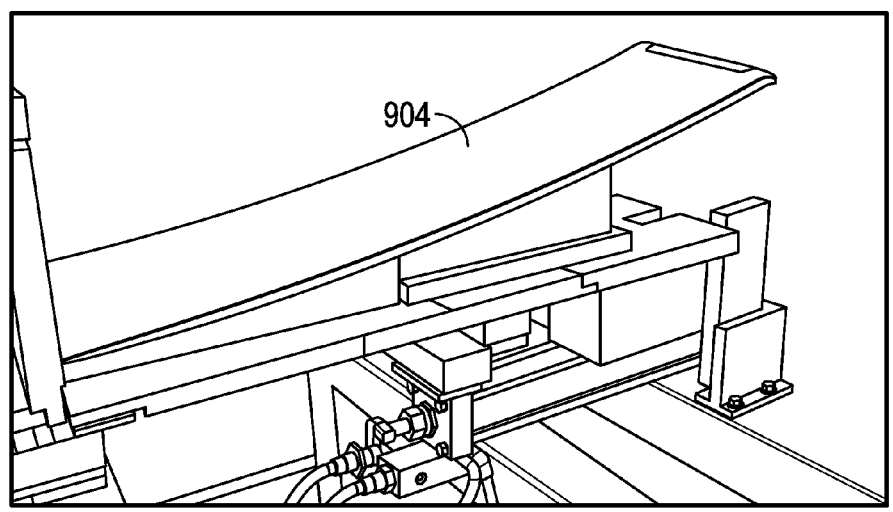
Figure 10D:
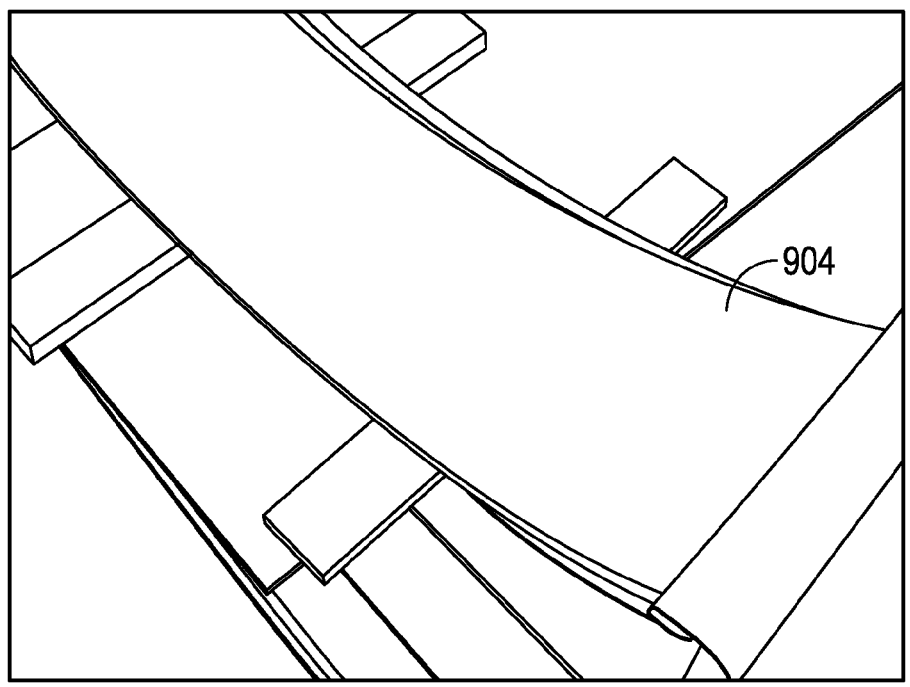
Figure 10E:
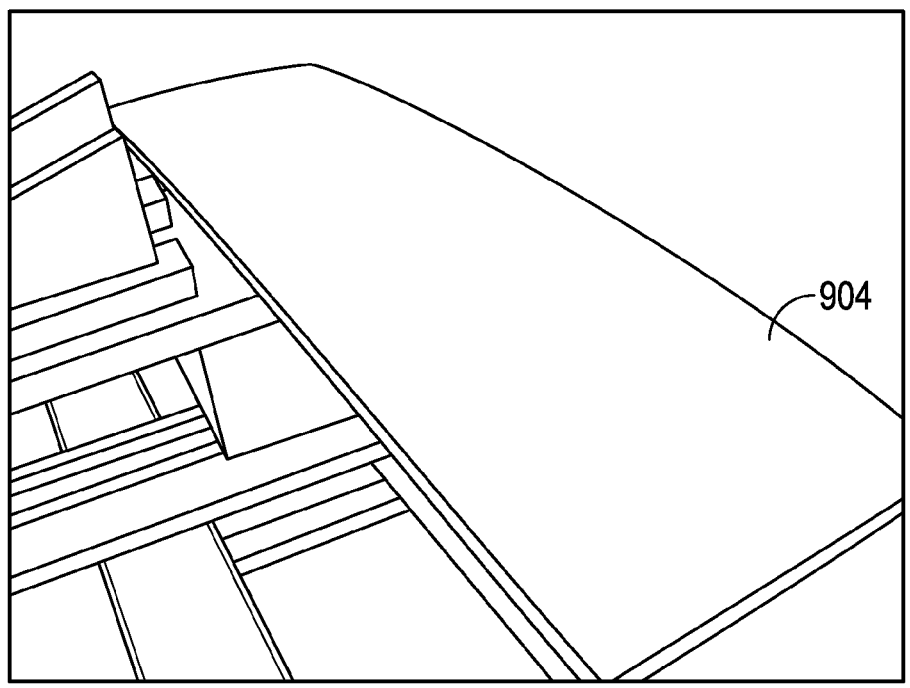

In the embodiment shown, the thermoplastic pultrusion die system 900 and method are used to sequentially form from the input into the processing die of flat thermoplastic composite sandwich panel material into 100% spherical-curved sandwich panels 904 that exit the processing die, which are assembled together to form a rhombic triacontahedron composite radome 906 such as that shown in FIG. 9 to protect a vast number of radar installations, including military radar. The flat sandwich panels include a foam core with top and bottom skins and as an option, 3-dimensional fibers transit from one skin to the other, through the foam. In alternative embodiments or implementations, the thermoplastic pultrusion die system 900 and method are used to post mold sandwich panels for other applications, including panels of different spherical diameters and different cylindrical shapes, as well as complex curvatures.

The thermoplastic pultrusion die system 900 includes a spherically curved die 910 in the shape of the defined spherical diameter of rhombic triacontahedron radome panels 906. The die 910 includes a die bottom 930 with a curved, spherical, concave top surface 935 and die top 940 with a curved, spherical, convex bottom surface 945. Together, the curved, concave top surface 935 of the die bottom 930 and the curved, convex bottom surface 945 of the die top 940 form a curved spherical die cavity gap 947.

As shown in FIGS. 10A-10D, during the efficient in-line thermoplastic pultrusion method, the flat sandwich composite panels are processed into continuous curved, spherical sandwich composite panel parts 904. The curved sandwich composite panel parts 904 exiting the die system 900 climb according to the curvature being formed. In the embodiment shown, the curved sandwich composite panel parts 904 are of the same length, size, and curvature and are assembled together to make the radome 906 to protect military radar. In alternative embodiments, it may be desirable to make curved configurations/structures where one of more of the curved panels have a different curvature, length, and/or size. In a still further embodiment, the convex and concave surfaces and die members are reversed, such that the spherical resultant panel exiting the die members curves in a downward direction.

With reference to FIG. 9, the rhombic triacontahedron composite radome 906 is a sandwich panel radome of the A-Sandwich variety wherein the thin skins on each side are a thermoplastic resin matrix with glass encapsulating a foam core, and the combination of the thin skins and the foam core are radio frequency (RF) transparent and sized to be approximately ¼ the wavelength of the radar frequency of the military radar being protected. The radome 906 is made of spherical panels 904 and is of the order of 30 feet to 60 feet in diameter, but clearly could be any diameter from 5 feet to 200 feet in dimension. Because the radome 906 is a rhombic tricontrahedron radome, there is only one-sized panel to make the sphere. Because the radome 906 is a rhombic triacontahedron radome, there is only one-sized panel to make the sphere, excluding the truncated panels that attach to a mounting ring or foundation, at 908, and each said truncated panel is made from a larger, aforementioned one-sized panel.

Hydrophobic films or coatings/paints can be applied to the outside of the radome sandwich part 904 prior to assembly to resist weathering and to keep the radome 906 clean and free of water droplets, in order to affect the superior transmission capability of the radar.

To house the radome 906, there is a truncation of the dome, at approximately 85% of the height/diameter of the radome 906, where a mounting ring 908 is located and the radome 906 bolts, or is fastened, to the mounting ring 908 for structural stiffness and rigidity, and here there is a set of different shaped panels, but each formed from the same base-singular panel 904, to create the spherical radome 906. In an alternative embodiment, the radome 906 is made of panels 904 having a few different configurations of a multitude of geodesic designs involving radome shapes, pentagons, hexagons, radome-shapes, oranger-peel shapes, and the like.

Figure 11:
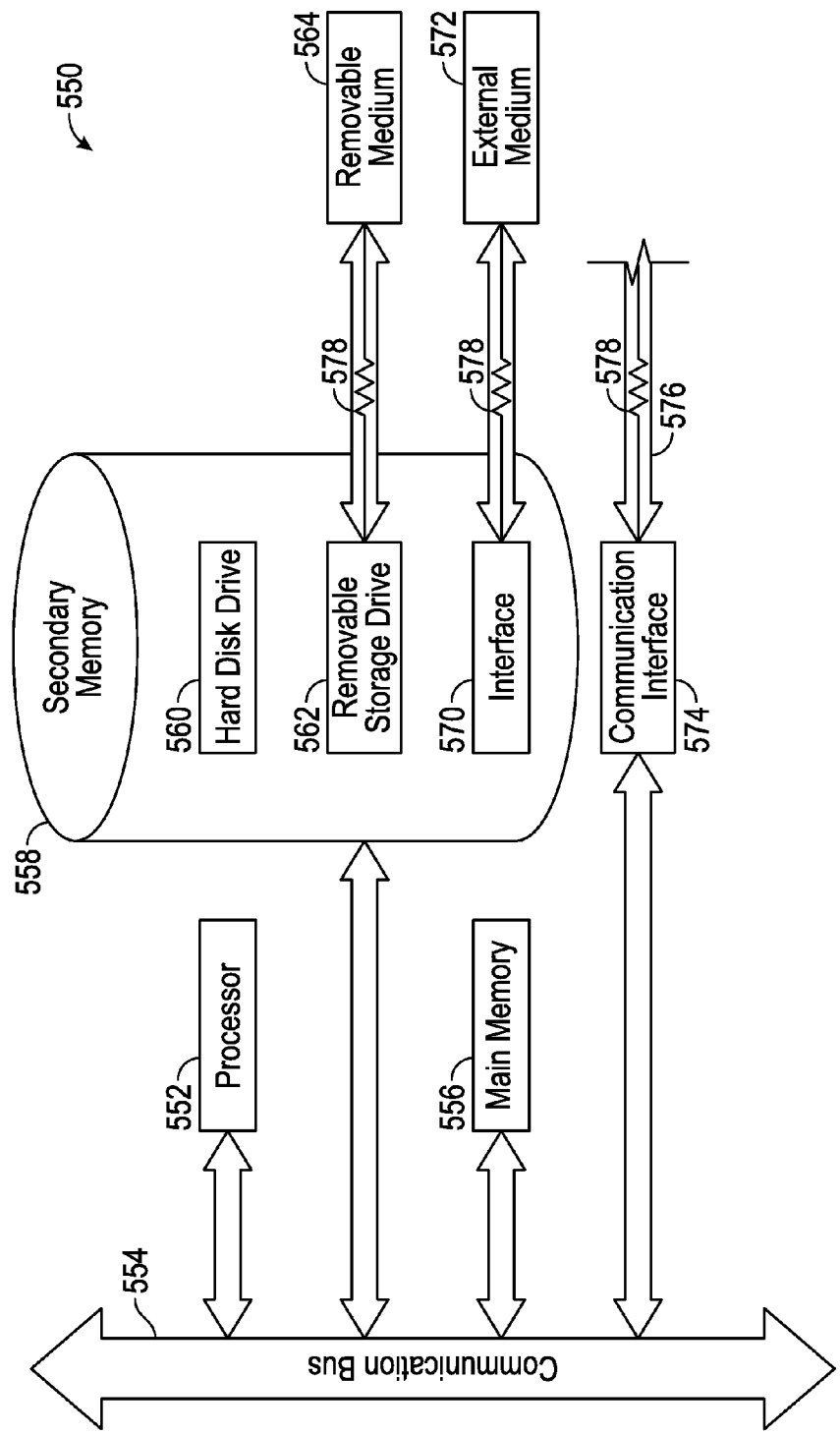
FIG. 11 is a block diagram illustrating an example computer system that may be used in connection with various embodiments described herein.

FIG. 11 is a block diagram illustrating an example computer system 550 that may be used in connection with various embodiments described herein. For example, the computer system 550 may be used in conjunction with the computer system(s), computer(s), control(s), controller(s), control system (e.g., software, and/or hardware). However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A thermoplastic pultrusion die system for pultruding a thermoplastic composite, comprising:
    a first pultrusion die member with a curved, spherical, concave top surface;
    a second pultrusion die member with a curved, spherical convex bottom surface;
    a curved die cavity gap formed between the curved, spherical concave top surface of the first pultrusion die member and the curved, spherical convex bottom surface of the second pultrusion die member;
    a die cavity gap adjustment mechanism that imparts movement to at least one of the first pultrusion die member and the second pultrusion die member to vary the die cavity gap from closed to a first predetermined location to open at a second predetermined location;
    a pultrusion gripper mechanism having one or more grippers in series, and
   a computer numerical control (CNC) computer system controlling the die cavity gap adjustment mechanism,
    wherein the (CNC) computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to incrementally consolidate the thermoplastic composite by compressing the thermoplastic composite with the thermoplastic pultrusion die system at a zero line speed alternated with pultruding the thermoplastic composite on incremental distance at no compression using the pultrusion gripper mechanism whereby the pultrusion gripper mechanism configured to accelerate and decelerate the thermoplastic composite over a predetermined programmed distance until the zero line speed is again achieved.

2. The system of claim 1, wherein the system further includes a belt material at both the first pultrusion die member and the second pultrusion die member that is fed between the first pultrusion die member and the thermoplastic composite material, and the second pultrusion die member and the thermoplastic composite material, wherein the belt material is a release material.

3. The system of claim 1, wherein the die cavity gap adjustment mechanism includes one or more servo motors.

4. The system of claim 3, wherein the computer numerical control (CNC) computer system is a (CNC) controller for servo motion control of the die cavity gap adjustment mechanism includes for control of the die cavity gap.

5. The system of claim 3, wherein the die cavity gap adjustment mechanism includes one or more ball screws rotatably driven by the one or more servo motors.

6. The system of claim 1, wherein the die cavity gap adjustment mechanism includes one or more hydraulic cylinders with a maximum pressure setting.

7. The system of claim 1, wherein the first pultrusion die member and the second pultrusion die member are part of a series of pultrusion die members, one or more of which move towards and away a center of gravity of the thermoplastic composite material for thermoplastic pultrusion of a part.

8. The system of claim 1, wherein the computer numerical control (CNC) computer system controls the die cavity gap adjustment mechanism to control the die cavity gap based on at least thickness of the thermoplastic composite material and one or more thickness anomalies in the thermoplastic composite material.

9. The system of claim 1, wherein the system includes one or more sensors to sense composite processing pressure.

10. The system of claim 9, wherein the one or more sensors include one or more load cells.

11. The system of claim 9, wherein the one or more sensors include one or more gripper load cells associated with the pultrusion gripper mechanism for sensing at least one of frictional forces and loads associated with pultrusion by the system.

12. The system of claim 1, further including (CNC) hydraulic cylinders to prevent the die cavity gap from being less than a predetermined-position compression distance.

13. The system of claim 1, wherein the one or more computer programmed module elements configured to allow higher-thickness pre-preg thermoplastic materials to be processed by the thermoplastic pultrusion die system without crashing a pultrusion process and whereby the higher-thickness pre-preg thermoplastic materials entering the thermoplastic pultrusion die system being thicker than cured thermoplastic materials exiting the thermoplastic pultrusion die system.

14. The system of claim 1, wherein the thermoplastic pultrusion die system includes a heater, a consolidation-under-pressure zone, and a length to allow heating of the thermoplastic composite prior to the consolidation-under-pressure zone, allowing faster processing speeds.

15. The system of claim 1, wherein the one or more computer programmed module elements configured to consolidate the thermoplastic composite in the consolidation-under-pressure zone under a hot melt condition at the inlet end with the heating elements and consolidate the thermoplastic composite in the consolidation-under-pressure zone under a cold solid condition at the exit end with the cooling elements before exiting the consolidation-under-pressure zone.

16. The system of claim 1, wherein the convex and concave surfaces and die members are reversed, such that the spherical resultant panel exiting the die members curves in a downward direction.

* * * * *